United States Patent [19]
Nespor

[11] Patent Number: 5,692,871
[45] Date of Patent: Dec. 2, 1997

[54] WHEEL LIFT TOWING DEVICE

[75] Inventor: Ronald B. Nespor, Mercer, Pa.

[73] Assignee: Chevron, Inc., Mercer, Pa.

[21] Appl. No.: 754,532

[22] Filed: Nov. 21, 1996

[51] Int. Cl.⁶ .................................................. B60P 3/12
[52] U.S. Cl. ........................ 414/563; 280/402; 294/88; 414/428
[58] Field of Search .............................. 414/563, 426, 414/427, 428, 546, 555, 253, 259; 280/402; 294/88, 104, 115; 269/25, 17

[56] References Cited

U.S. PATENT DOCUMENTS

| | | |
|---|---|---|
| 2,404,639 | 7/1946 | Lane . |
| 3,159,293 | 12/1964 | Bianca . |
| 3,891,104 | 6/1975 | Pilch . |
| 4,473,334 | 9/1984 | Brown . |
| 4,564,207 | 1/1986 | Russ et al. . |
| 4,573,857 | 3/1986 | Porter, Sr. et al. . |
| 4,674,943 | 6/1987 | Nespor . |
| 4,678,392 | 7/1987 | Capers et al. . |
| 4,797,057 | 1/1989 | Shoup et al. . |
| 5,326,216 | 7/1994 | Russ . |
| 5,350,271 | 9/1994 | Weller . |
| 5,518,260 | 5/1996 | Grignon . |

FOREIGN PATENT DOCUMENTS

| | | | |
|---|---|---|---|
| 2069809 | 12/1992 | Canada . | |
| 56-51647 | 5/1981 | Japan . | |
| 1331800 | 8/1987 | U.S.S.R. | 294/88 |
| 1379221 | 3/1988 | U.S.S.R. | 294/88 |

OTHER PUBLICATIONS

Century Brochure, "Century's F–A".

Primary Examiner—Frank E. Werner
Attorney, Agent, or Firm—Fay, Sharpe, Beall, Fagan, Minnich & McKee

[57] ABSTRACT

A wheel lift towing device includes a boom for mounting to a towing vehicle and having a cross bar connected to its rear end. A pair of wheel retainer arms are each rotatably mounted offset from one end of the cross bar and devices are provided for rotating each wheel retainer arm which includes motive devices operatively connected to the wheel retainer arm by elongated flexible devices. Each wheel retainer arm cooperates with a wheel retaining plate and an end of the cross bar to cradle and support a wheel.

24 Claims, 6 Drawing Sheets

WHEEL LIFT TOWING DEVICE

BACKGROUND OF THE INVENTION

1. Field of the Invention

The present invention relates to a wheel lift type vehicle lifting and towing device and, more particularly, to such a device having elongated flexible means for rotating wheel retainer arms from a fully closed position to a fully opened position.

2. Description of the Related Art

It has been conventional to lift vehicles for towing by means of a winch and a cable having a hook at its end or by use of a sling system whereby a vehicle is lifted by a sling suspended from a boom at the rear of a tow truck. With the current designs of automobiles, however, it is no longer possible to lift many of such vehicles with either a conventional winch and a cable or a sling system without damaging the vehicle. Accordingly, wheel lift types of lifting and towing devices wherein a vehicle is lifted by engaging its wheels with some form of wheel retaining assembly have become common and well known in the art.

While such prior wheel lift types of lifting and towing devices generally have been satisfactory, they nevertheless have been found to have certain disadvantages. In many such prior devices, rotatable wheel retaining arms are not able to be rotated to a fully open, non wheel engaging position or a fully closed storage position wrapped around the ends of a cross bar. In other such prior art devices, the wheel receiving or retaining assemblies have arms which must be pivoted from a position outside of the wheels of the vehicle to a position adjacent the wheels. This can make it difficult to position the wheel retaining devices in a wheel cradling position when one or more of the wheels is against an obstacle such as a curb. Still other such prior wheel retaining assemblies have removable arms which must be manually inserted or connected for lifting and towing and manually disconnected for storage. This is time consuming, cumbersome and requires heavy lifting and handling. Moreover, devices with such manually connected arms cannot be readily adjusted to vary the tightness with which a wheel can be gripped. Accordingly, such manually operated devices can not easily grip a deflated tire. Other prior wheel lift devices can not be moved to a horizontal storage position adjacent the end of a towing vehicle but must be rotated to a vertical position for storage.

SUMMARY OF THE INVENTION

It is an object of the present invention to provide an improved wheel lift towing device having wheel retainer arms automatically rotatable from a storage position wherein the ends of the arms are wrapped around the ends of a cross bar to a fully opened position wherein the arms are retracted to a position adjacent the rear end of a cross bar to permit insertion of the arms between the wheels of a vehicle and then to rotate the arms outwardly back to a wheel engaging position wherein the arms securely cradle the wheels of a vehicle from between or inside of the wheels.

It is another object of the present invention to provide an improved wheel lift device having wheel retainer arms automatically rotatable from the inside outwardly to engage the inside, front and back faces of the wheels.

It is still another object of the present invention to provide a wheel lift towing device having wheel retaining arms which are automatically rotated by hydraulic means having elongated flexible means connected to the arms which permit the arms to be rotated between a fully opened position to be positioned conveniently between two wheels of a vehicle and a fully closed horizontal storage position wherein the ends of the arms wrap around the ends of a cross bar.

It is a further object of the present invention to provide a wheel lift towing device having automatically rotatable wheel retainer arms which remain fixedly attached to the device while being rotated from a storage position to a fully opened position and then to a wheel retaining position whereby the wheels of a vehicle are cradled from the inside face thereof.

It is another object of the present invention to provide a wheel lift device having automatically rotatable wheel retainer arms whereby the tightness of the grip on a vehicle's wheels may be readily adjusted to tightly grip a deflated wheel or wheels of different sizes.

It is a still further object of the present invention to provide a wheel lift device with automatically rotatable wheel retainer arms whereby the arms may be rotated to a storage position wrapped around the ends of a cross bar so that the cross bar can be stored in a horizontal storage position adjacent the rear end of a towing vehicle from where the device may be quickly automatically moved to a vehicle hook-up position.

It is still another object of the present invention to provide a wheel lift device having automatically rotatable wheel retainer arms which may be rotated to a fully opened position whereby when the cross bar is rotated to a sharp angle to a vehicle's wheels, a relatively large amount of space is available for the arms to fit between the wheels.

The present invention achieves the above and other objects by providing a wheel lift towing device for attachment to the rear of a towing vehicle. The wheel lift device includes an extensible boom pivotally mounted to the vehicle for up and down movement and a cross bar pivotally attached to the rear end of the boom. A pair of wheel retainer arms are rotatably mounted offset from the ends of the cross bar and means are provided for rotating the wheel retainer arms comprising motive means operatively connected to the wheel retainer arms by elongated flexible means. Mounting means symmetrically and rotatably mount the wheel retainer arms to the cross bar with the mounting means being offset from opposing end portions of the cross bar.

The motive means for each wheel retainer arm may be a hydraulic cylinder device having a barrel movable along a fixed rod with a pair of elongated flexible means in the form of chains connected between the barrel of the hydraulic cylinder and the wheel retaining arm. The rod and barrel are mounted at a fixed angle of approximately 15° to a longitudinal axis of the cross bar. One end of each elongated flexible means is attached to the wheel retainer arm, the other end of one of the elongated flexible means is attached to one end of the barrel and the other end of the other of the elongated flexible means is attached to the other end of the barrel.

Each wheel retainer arm is substantially L-shaped and has an arm portion and a transverse wheel engaging portion and is rotatable through a radial path from a horizontal storage position wherein the wheel engaging portion is wrapped around an end of the cross bar to a fully opened position wherein a back of each arm portion is adjacent the cross bar and the wheel engaging portion of one wheel retainer arm is adjacent the wheel engaging portion of the other wheel retaining arm. Each retainer arm further has an intermediate position in the radial path wherein the arm portion is transversely oriented to the cross bar whereby the wheel retainer arm cooperates with an end of the cross bar to form an outwardly directed substantially U-shaped frame for engaging a wheel.

These, together with other objects and advantages which will be subsequently apparent, reside in the details of construction and operation as more fully hereinafter described in claimed, reference being made to the accompanying drawings forming a part hereof, wherein like numerals refer to like parts throughout.

DESCRIPTION OF THE PREFERRED EMBODIMENTS

Figure 1:
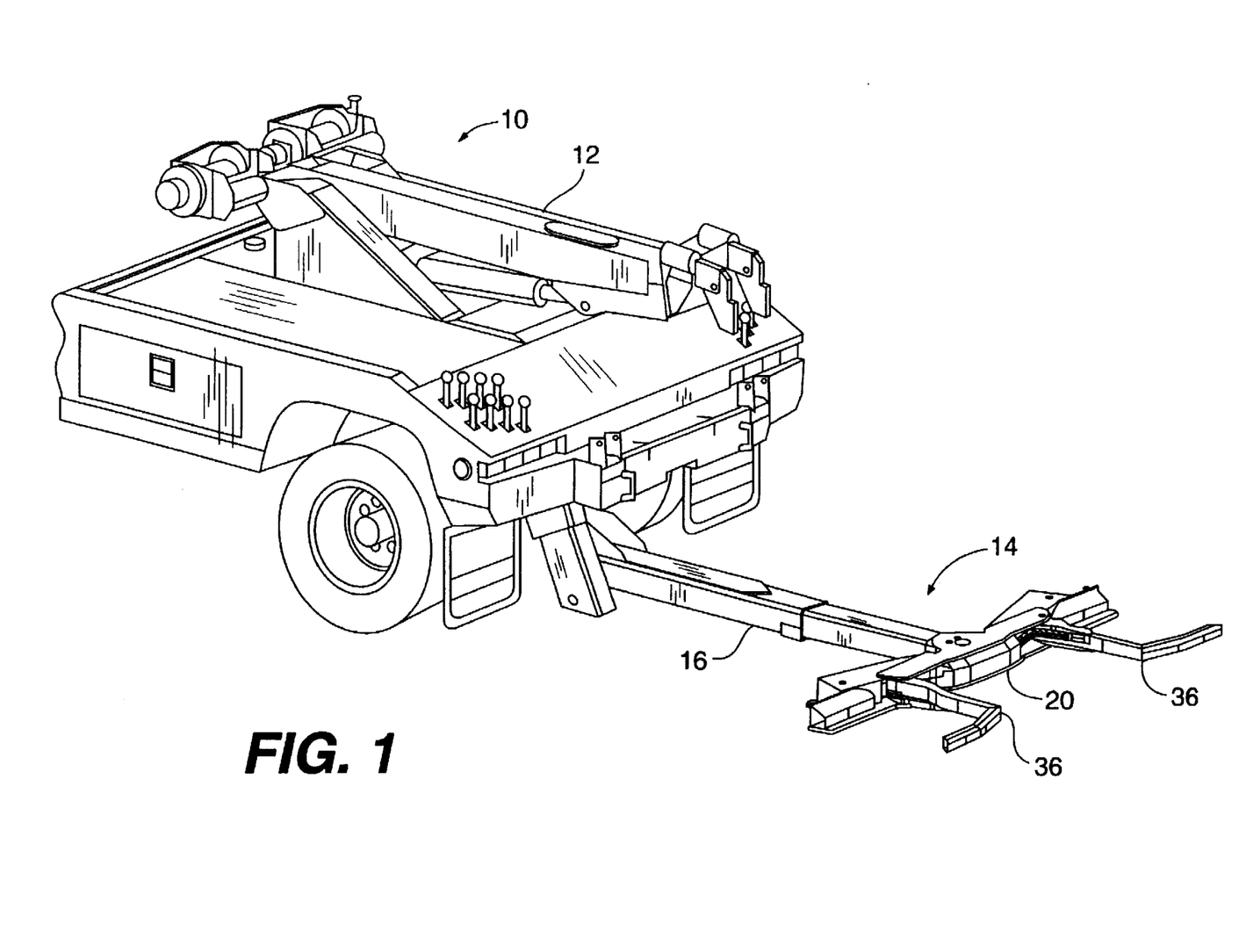
FIG. 1 is a perspective view of the rear of a tow truck provided with a wheel lift towing device according to the present invention and showing the device extending outwardly from the rear of the tow truck with the wheel retaining arms in a wheel engaging position.

Referring to the drawings, shown in FIG. 1 is a towing vehicle or truck 10 having a conventional crane or hoist 12 pivotally mounted to the back top portion of the truck and which may be raised and lowered. Attached to the understructure of the body of the tow truck adjacent the rear end thereof is a wheel lift vehicle lifting and towing device according to the present invention, generally indicated by the numeral 14. In FIG. 1, the wheel lift device is shown with an extensible boom 16 in a downwardly extended position. When in a retracted storage position, the back portion of the wheel lift device is in a substantially horizontal position adjacent the rear end of the truck.

Referring to FIGS. 2–7, the wheel lift device 14 includes a cross bar 20 pivotally attached at pivot point 21 to the end of the boom 16. The cross bar 20 includes generally straight sections 24 and 25 extending the length of the cross bar along its longitudinal axis. An angular section 26 protrudes forwardly and outwardly from each side of the center of the cross bar at an angle of approximately 15° to the cross bar's longitudinal axis to enclose and position motive means 44 for rotating wheel retainer arms 36. This non-parallel orientation of angular section 26 with respect to the longitudinal axis allows the motive means also to be mounted in a fixed, non-parallel orientation with respect to the longitudinal axis of the cross bar whereby the fixed motive means can provide a sufficient stroke to rotate the wheel retainer arms to a fully closed and a fully opened position.

Figure 3:
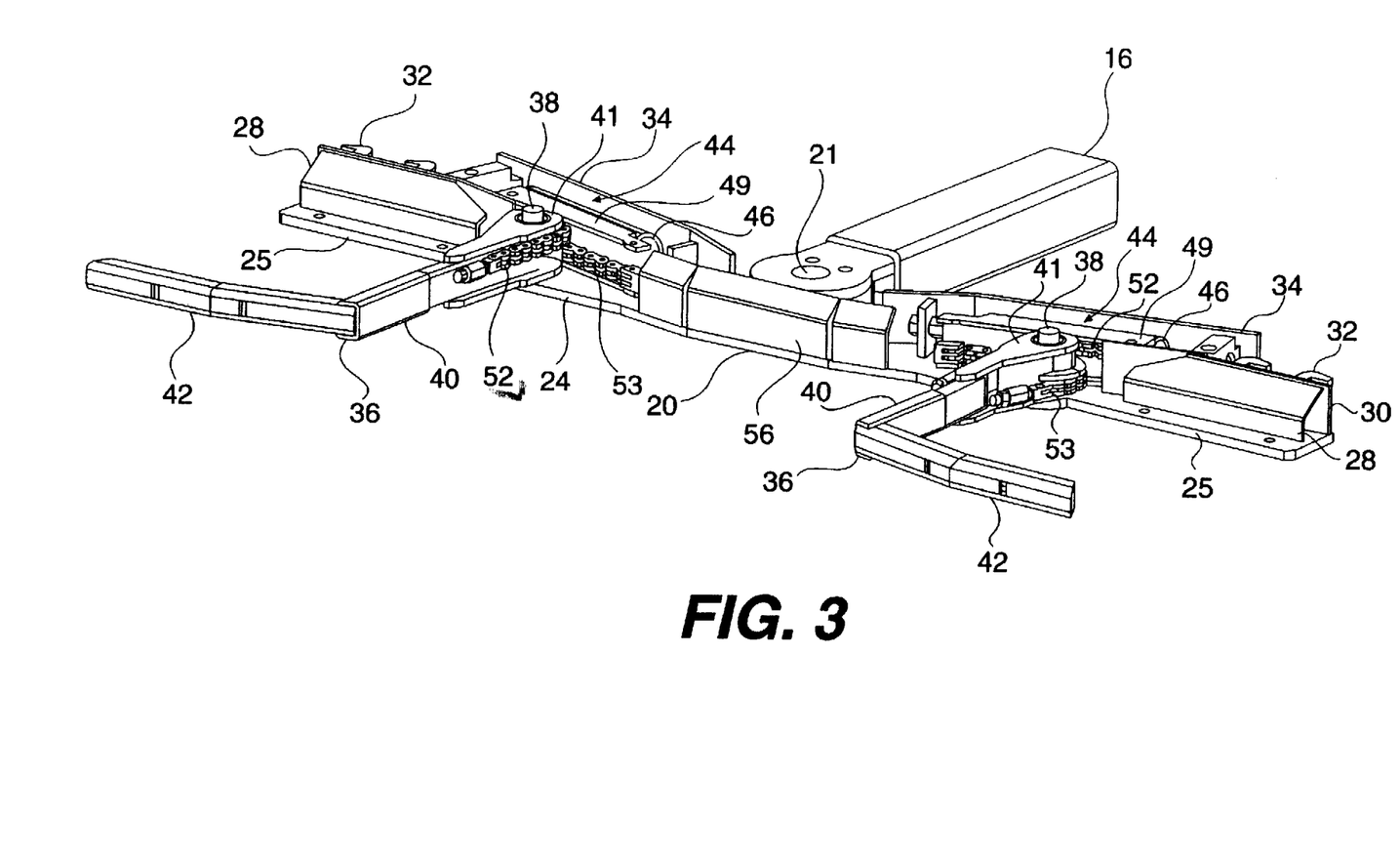
FIG. 3 is an enlarged perspective view from the right rear side of the wheel retainer assembly showing the wheel retainer arms in a wheel engaging position with the top plate of the cross bar removed to show its inner workings.

A bent plate 28 is provided at each end of the cross bar to support an outer face of a wheel. As best shown in FIG. 3, the upper end of bent plate 28 is fastened to a plate 30 upstanding from the upper surface of an end portion of the cross bar. Attached to the front of each plate 30 are a pair of hooks 32 to accommodate tie down chains or straps. Another upstanding plate 34 is attached to the front of each angular section 26 of the cross bar.

Figure 5:
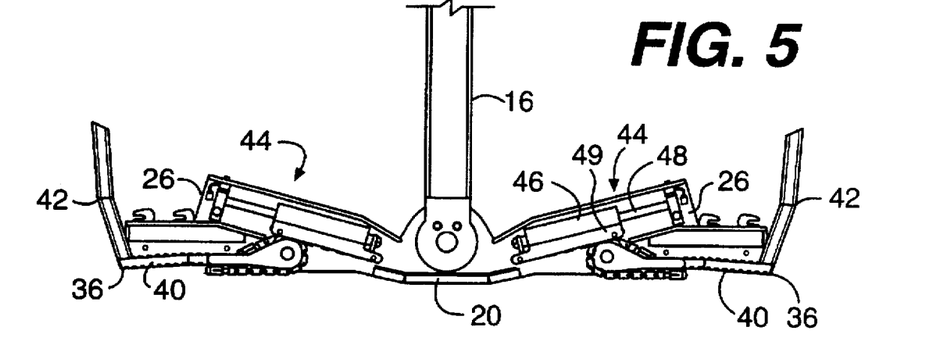
FIG. 5 is a top plan view with the top plate of the cross bar removed showing the wheel engaging arms of the wheel lift device of the present invention in a closed horizontal storage position whereby the ends of the wheel retaining arms wrap around and extend forwardly from the ends of the cross bar.
Figure 6:
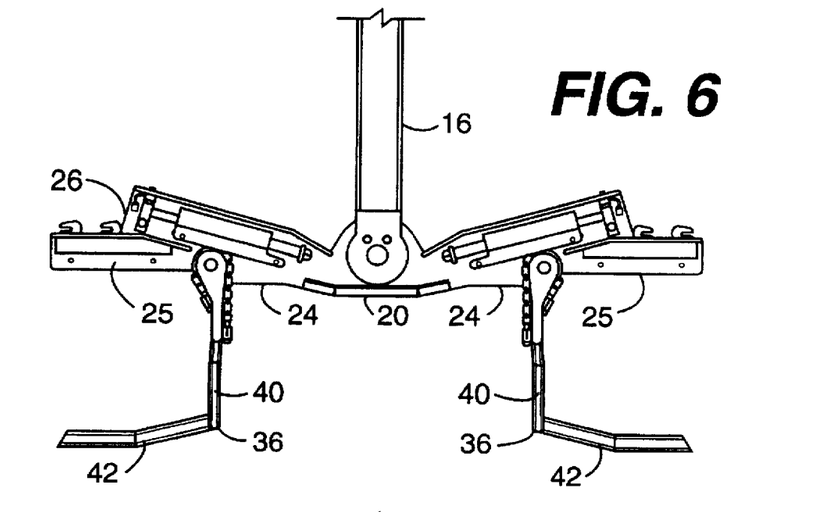
FIG. 6 is a similar top plan view of the wheel lift device showing the wheel retainer arms rotated to an intermediate wheel retaining position.
Figure 7:
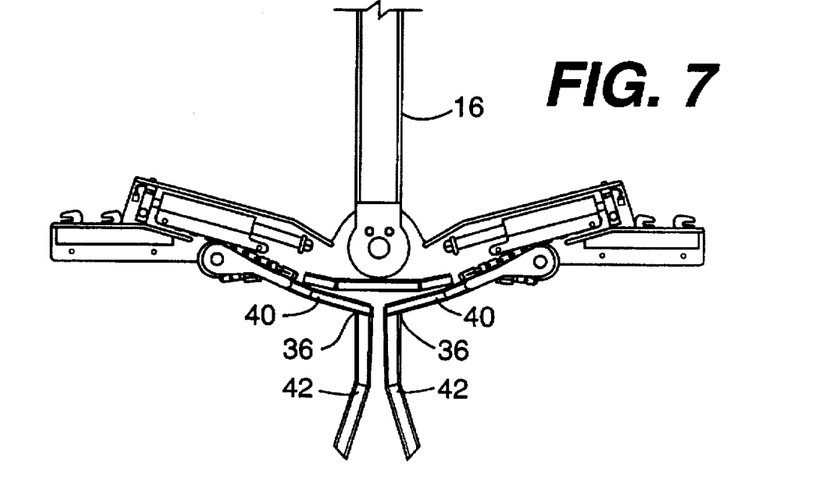
FIG. 7 is a similar top plan view of the wheel lift device showing the arms rotated to a fully open position.

The rotatable wheel retainer arms 36 are pivotally mounted by suitable means such as pins 38 to the cross bar at offset points from each end thereof. Each wheel retainer arm is substantially L-shaped in configuration and has a first arm portion 40 and a second wheel engaging portion 42 transverse to said arm portion. As best shown in FIGS. 5–7, each arm portion 40 is slightly bent outwardly at the mid-point thereof. This bend in the arm portion 40 permits the arms to be more closely together when in the fully opened position shown in FIG. 6. Each arm portion 40 further has a pivotal base portion 41 rotatably mounted to the cross bar, with the base portion having a radial surface at its front end.

Figure 2:
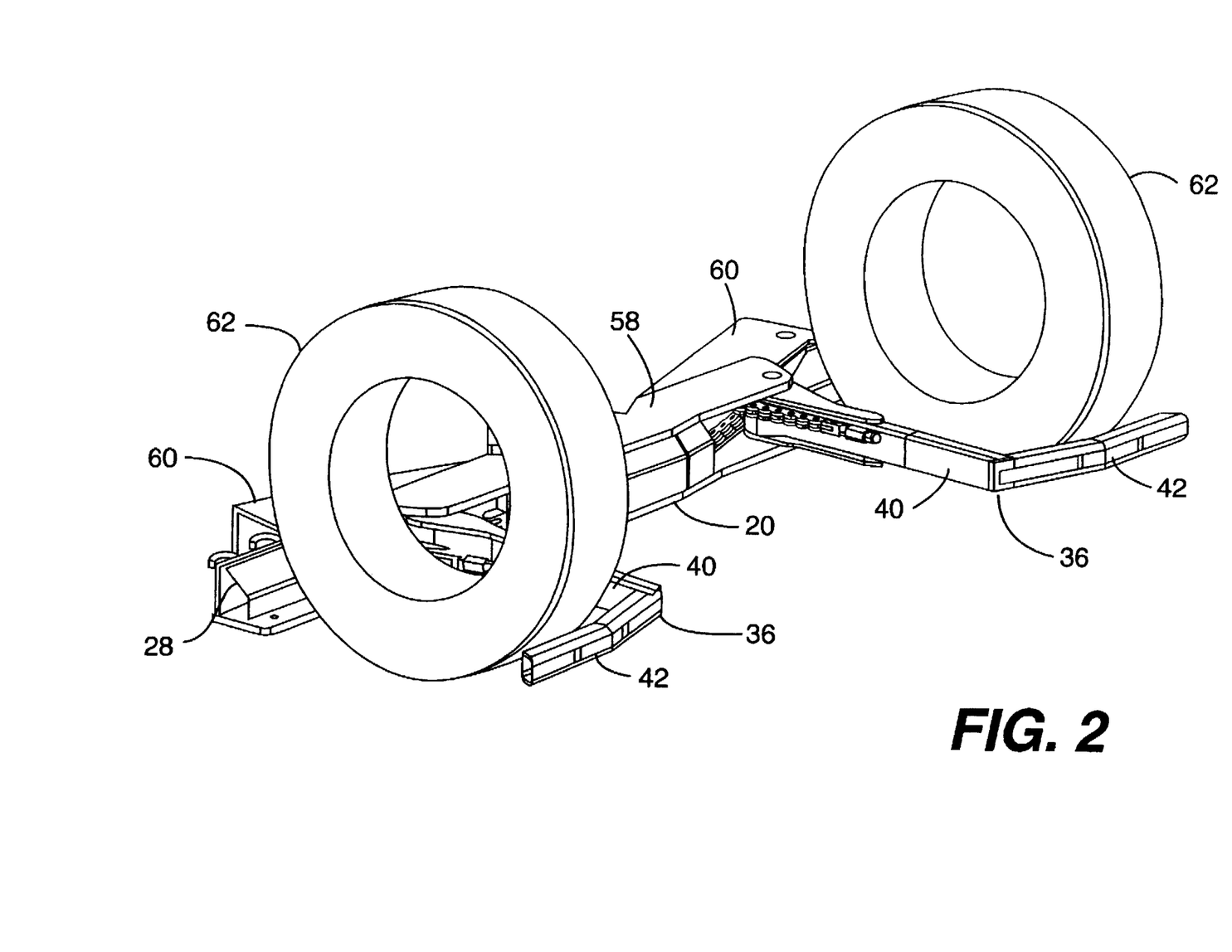
FIG. 2 is a perspective view from the left rear side of a wheel retainer assembly of the present invention showing the wheel retainer arms in position cradling a pair of wheels of a vehicle.

Each wheel engaging portion 42 of each wheel retainer arm is bent inwardly at approximately the mid-point thereof. This bend not only permits wheel engaging portion 42 to more closely simulate the curved surface of a wheel but also permits automatic adjustment for different sized tires. For example, when the wheel retainer arms are in a wheel engaging position as shown in FIGS. 2 and 6, a tire with a smaller diameter will have a smaller track width and would be positioned closer to the connection between the arm portion 40 and the wheel engaging portion 42 whereas a wheel with a larger diameter will have a wider track width and would be positioned closer to the outside of the wheel engaging portion 42 of the wheel retainer arm.

Figure 4:
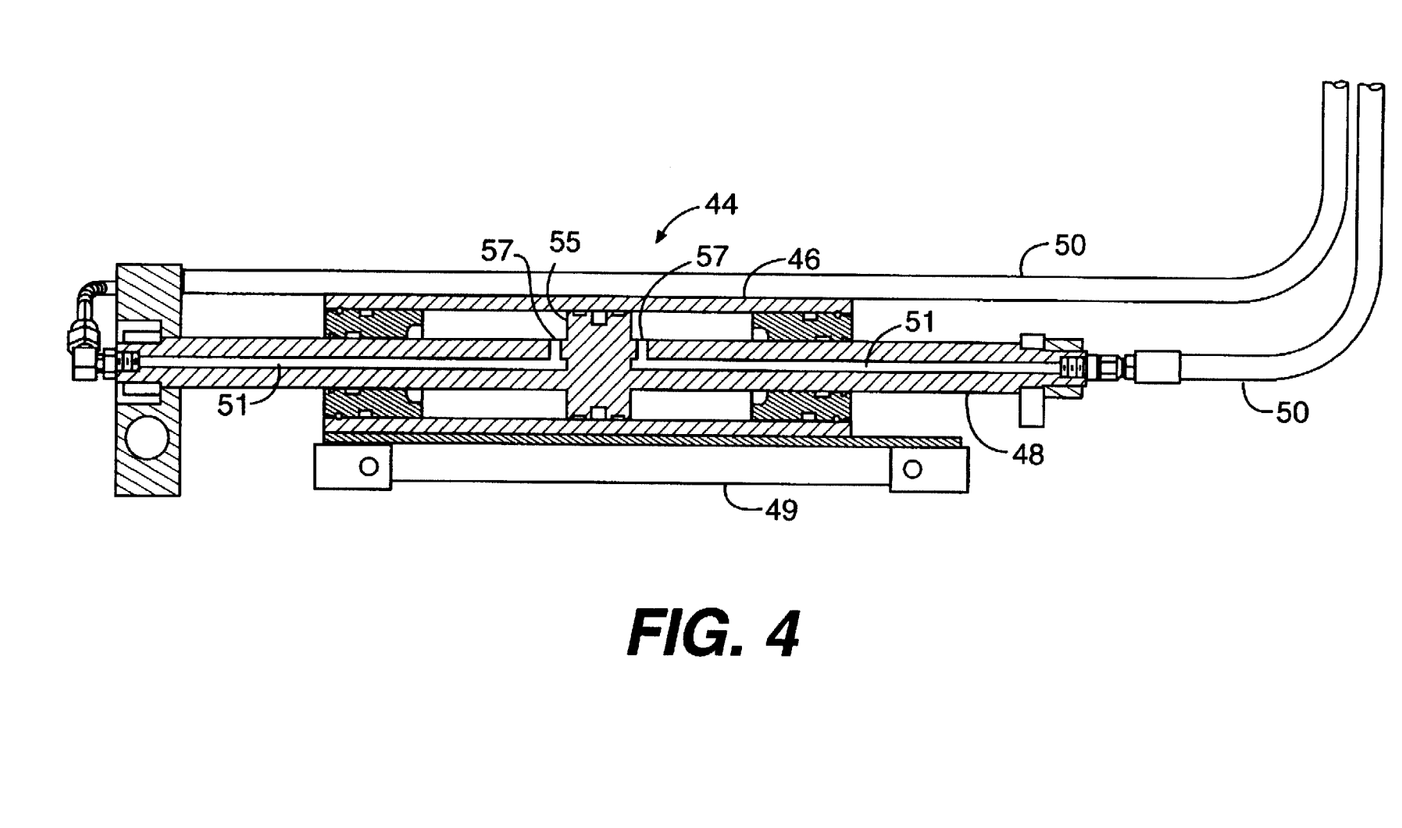
FIG. 4 is an enlarged, cross sectional top plan view of a hydraulic cylinder motive means having a barrel movable along a fixed rod according to the present invention.

In the embodiment best shown in FIGS. 3 and 4, each motive means 44 comprises a hydraulic cylinder means having a barrel 46 and a fixed rod 48 with the barrel being slidable along the rod. Each barrel has an I-beam 49 attached to its back side. Each hydraulic cylinder means is rigidly mounted within and along angular section 26 at a fixed angle of approximately 15° to the longitudinal axis of the cross bar. The 15° non-parallel orientation of the cylinder means is necessary to provide sufficient stroke to move the wheel retainer arms through a full range of motion from a fully closed position to a fully opened position. A parallel relationship between the cylinder means and the longitudinal axis such as shown in Russ et al, U.S. Pat. No. 4,564,207 would not provide sufficient stroke to move the wheel retainer arms through their full range of motion.

Each end of fixed rod 48 has a hollow central chamber 51 therein supplied with hydraulic fluid from either end through hoses 50 as shown in FIG. 4. The fixed rod 48 of each hydraulic means has a piston 55 mounted on its center thereof and the hollow chamber 51 at each end of the fixed rod has an opening 57 adjacent to the piston whereby fluid injected through the opening acts against the piston and an end of the barrel to cause the barrel to move along the length of the rod.

As most clearly shown in FIG. 3, a pair of elongated flexible means such as chains 52, 53 are connected between the hydraulic cylinder means 44 and each side of a wheel retainer arm 36. The chains comprise an upper chain 52 and a lower chain 53. The first upper chain 52 is attached at one end to the outside of arm portion 40 of each wheel retainer arm and is attached at the other end to an end of I-beam 49 adjacent an end of the barrel 46 of the hydraulic cylinder means. The second lower chain 53 is attached at one end to the inside of the arm portion of each wheel retainer arm and is attached at its other end to the opposite end of the I-beam 49 adjacent the opposite end of the barrel 46. A separator flange 54 may be provided on the radial end of the arm portion 40 to provide a support for the upper chain 52. The bottom flange of I-beam 49 supports the lower chain 53. With this construction, when the barrel 46 is moved by hydraulic pressure in one direction, it causes one of the chains to rotate a wheel retainer arm in one direction and movement of the barrel in an opposite direction causes the other of the chains to rotate the wheel retainer arm in an opposite direction.

While in the preferred embodiment shown in the drawings, the elongated flexible means are shown as chains, other suitable means may be utilized such as a cable, a strap or a band.

As most clearly shown in FIG. 3 the cross bar 20 preferably has an upstanding bent plate 56 on the backside in the center thereof. Moreover, as shown in FIG. 2, the device preferably has a top plate 58 extending over the central portion of the cross bar. In addition, each angular section 26 preferably has a top plate 60 thereon.

In operation of the wheel lift device of the present invention, the boom is extended and the wheel retainer arms are opened from the closed position shown in FIG. 5 to a fully open position as shown in FIG. 7 wherein the back of the arm portions of the wheel retainer arms contact the back central portions of the cross bar and the wheel engaging portions 42 are adjacent to each other in a generally parallel relation. The boom is then lowered and the towing vehicle is positioned so that the wheel retainer arms are close to the wheels of a vehicle to be towed. While backing the towing vehicle up into position, the wheel engaging portions 42 of the wheel retainer arms may serve as guides for an operator of the vehicle to properly position the wheel retainer arms to the center of the vehicle being towed. The wheel retainer arms 36 are then positioned between the wheels 62 of a vehicle and rotated outwardly to engage the wheels as shown in FIG. 2. When the wheel retainer arms 36 are in the wheel retaining position, the wheels 62 of the vehicle are cradled between the arm portions 40, the wheel engaging portions 42 of each arm, the bent plates 28 and the ends of the cross bar 20.

While in FIGS. 2 and 6 the arm portions 40 of the wheel retainer arms 36 are shown as being generally perpendicular to the cross bar when in a normal wheel engaging position, the wheel retainer arms may be rotated farther outwardly to an angle greater than 90° to more securely grab a tire by hydraulically controlling the grip. This is a particularly advantageous feature if a wheel is deflated or underinflated.

Figure 8:
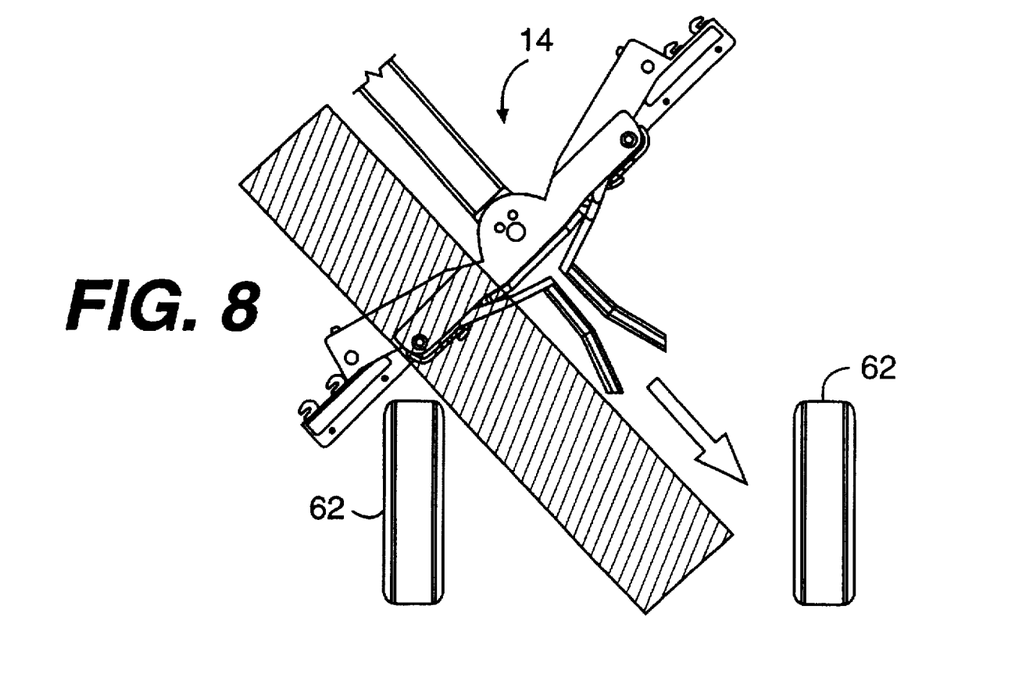
FIG. 8 is a top plan view of the wheel lift device of the present invention illustrating that when the wheel retainer arms are in a fully opened position and the device is at a sharp angle to a vehicle's wheels, a relatively large amount of space is available for the arms to fit between the wheels.

The construction of the wheel lift device of the present invention permits the wheel retainer arm to be moved to a fully opened position as shown in FIG. 7 which provides a relatively large amount of space available for the arms to fit between the wheels of a vehicle when the device is at a sharp angle to a vehicle's wheels 62 as shown in FIG. 8. This is a particularly useful feature when direct access to the wheels of a vehicle is blocked by an obstacle such as another vehicle.

Figure 9:
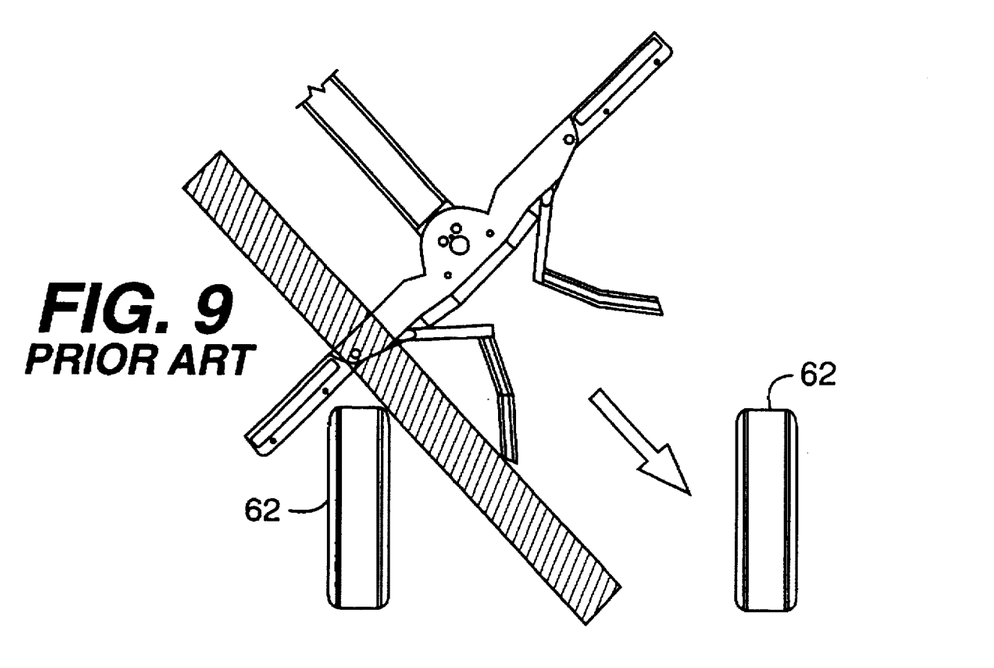
FIG. 9 is a top plan view of a wheel lift device of the prior art illustrating that when such prior art wheel retainer arms are not capable of being rotated to a fully open position adjacent the cross bar, a lesser amount of space is available for the arms to fit between the wheels of a vehicle when the devices is at a sharp angle to the wheels.

Some prior art devices employing a hydraulic cylinder directly connected to the wheel retainer arms only permit the arms to be partially opened to the extent shown in FIG. 9. See, for example, the prior art device shown in FIG. 14 of U.S. Pat. No. 4,674,943. This does not permit as large a space for the arms to fit between the wheels of a vehicle when the device is at a sharp angle to the wheels. As shown by comparing the cross hatched areas of FIG. 8 and FIG. 9, the cross hatched area of FIG. 8 is over twice as wide as the cross hatched area of FIG. 9 showing the space available with some prior art devices employing hydraulic cylinders directly connected to the wheel retainer arm.

While the prior art Russ et al device of U.S. Pat. No. 4,564,207 does permit as large a space as shown in FIG. 8, the Russ et al device has other disadvantages. Thus, the Russ et al device does not provide sufficient cylinder stroke for a full range of motion of the wheel retainer arms as previously discussed due to the parallel relationship of the hydraulic cylinders with the cross bar. Moreover, because the cylinders of the Russ et al device are exposed, the hoses providing hydraulic fluid to the cylinders are also exposed. Accordingly, during extension and retraction of the boom and the rotation of the cross bar, the exposed hoses can be tangled or pinched which can cause rupture.

The use of elongated flexible means such as chains between the motive means and the wheel retainer arms as taught by applicant permit the wheel retainer arms not only to be pivoted to a fully closed, horizontal storage position wherein the ends of the arms wrap around the ends of the cross bar as shown in FIG. 5 but also permit the arms to be fully opened as shown in FIG. 7 to provide a greater amount of space for the arms to fit between the wheels of a vehicle when the device is at a sharp angle to the wheels of a vehicle as shown in FIG. 8. Moreover, the ability of the cross bar and arms to be positioned horizontally adjacent the rear end of a towing vehicle when in a storage position, permits the boom and the cross bar and arms to be quickly extended out to a position to engage the wheels of a vehicle. This is particularly advantageous in situations where speed is of the essence, such as when repossessing a vehicle.

In addition, the ability of the arms to wrap around the ends of the cross bar when in a fully closed or storage position is advantageous because the arms do not protrude beyond the end of the vehicle to any significant extent. This feature further is an advantage when the wheel lift device is used in car carrier applications, since the arms will not interfere with the ground when the bed is in a tilted position.

Moreover with the device of the present invention, the hoses which are connected to the ends of each fixed rod of the hydraulic cylinder means do not move and may be readily concealed and protected within the confines of the wheel lift device.

Numerous other modifications and adaptations of the present invention will be apparent to those skilled in the art and thus, it is intended by the following claims to cover all such modifications and adaptions which fall within the true spirit and scope of the invention.

I claim:

1. A wheel lift towing device for attachment to a towing vehicle comprising:

a boom for mounting to a towing vehicle;

a cross bar connected to a rear end of said boom;

a pair of wheel retainer arms, each of which is rotatably mounted offset from one end of said cross bar; and means for rotating each said wheel retainer arm comprising substantially rectilinearly movable motive means operatively connected to each said wheel retainer arm by a pair of oppositely acting flexible members whereby movement of said motive means in one direction causes one of said flexible members to rotate said wheel retainer arm in one direction and movement of said motive means in an opposite direction causes the other of said flexible members to rotate said wheel retainer arm in an opposite direction.

2. A wheel lift towing device according to claim 1, wherein each said wheel retainer arm is substantially L-shaped and has an arm portion and a transverse wheel engaging portion and said means for rotating the wheel retainer arms moves each wheel retainer arm through a radial path from a storage position wherein said wheel engaging portion is wrapped around an end of said cross bar to a fully open position wherein a back of each said arm portion is adjacent said cross bar and said wheel engaging portion of one wheel retainer arm is adjacent said wheel engaging portion of the other wheel retainer arm, each said wheel retainer arm having an intermediate position in said radial path wherein said arm portion is transversely oriented to said cross bar whereby said wheel retainer arm cooperates with an end of said cross bar to form an outwardly directed substantially U-shaped frame for engaging a wheel.

3. A wheel lift towing device according to claim 1, wherein said motive means for each said wheel retainer arm comprises hydraulic cylinder means.

4. A wheel lift towing device according to claim 3, wherein said hydraulic cylinder means are at an angle of approximately 15° to a longitudinal axis of said cross bar.

5. A wheel lift towing device according to claim 3, wherein each said hydraulic cylinder means comprises a barrel movable along a fixed rod.

6. A wheel lift towing device according to claim 5, wherein one end of each of said flexible members is attached to said wheel retainer arm, the other end of one of said flexible members is attached to one end of said barrel and the other end of the other of said flexible members is attached to the other end of said barrel.

7. A wheel lift towing device according to claim 6, wherein each of said flexible members comprises a chain.

8. A wheel lift towing device according to claim 3, wherein each of said flexible members comprises a chain.

9. A wheel lift towing device according to claim 1, wherein each said wheel retainer arm is substantially L-shaped.

10. A wheel lift towing device according to claim 9, wherein each said wheel retainer arm has an arm portion with a radial base at one end rotatably mounted to said cross bar and a transverse wheel engaging portion at the other end.

11. A wheel lift towing device according to claim 10, wherein said radial base terminates the arm at said one end and said flexible member is at least partially wrapped around said radial base.

12. A wheel lift towing device according to claim 1, wherein each said motive means comprises a movable portion and a fixed portion and wherein one end of each of said flexible members is attached to said wheel retainer arm, the other end of one of said flexible members is attached to one end of said movable portion and the other end of the other of said flexible members is attached to the other end of said movable portion.

13. A wheel lift towing device for attachment to a towing vehicle comprising:

a boom for mounting to a towing vehicle;

a cross bar connected to a rear end of said boom;

a pair of substantially L-shaped wheel retainer arms, each of which is rotatably mounted offset from one end of said cross bar;

means for rotating each said wheel retainer arm comprising substantially rectilinearly movable hydraulic cylinder means operatively connected to said wheel retainer arm by a pair of oppositely acting chains;

said hydraulic cylinder means comprising a barrel movable along a fixed rod; and one end of each of said chains being attached to said wheel retainer arm, the other end of one of said chains being attached to one end of said barrel and the other end of the other of said chains being attached to the other end of said barrel where by movement of said motive means in one direction causes one of said chains to rotate said wheel retainer arm in one direction and movement of said motive means in an opposite direction causes the other of said chains to rotate said wheel retainer arm in an opposite direction.

14. A wheel lift towing device according to claim 13, wherein each said wheel retainer arm has a radial base at one end rotatably mounted to said cross bar, said base terminating the arm at said one end with said chains at least partially wrapped around said radial base.

15. A wheel lift towing device according to claim 13, wherein said barrel and said fixed rod are at an angle of approximately 15° to a longitudinal axis of said cross bar.

16. A wheel lift towing device for attachment to a towing vehicle comprising:

a boom for mounting to a towing vehicle;

a cross bar connected to a rear end of said boom;

two wheel retainer arms;

mounting means for symmetrically and rotatably mounting said wheel retainer arms to said cross bar, said mounting means being offset from end portions of said cross bar; and means for rotating each of said wheel retainer arms comprising substantially rectilinearly movable motive means attached to said cross bar and operatively connected to each of the wheel retainer arms by a pair of oppositely acting flexible members whereby movement of said motive means in one direction causes one of said flexible members to rotate said wheel retainer arm in one direction and movement of said motive means in an opposite direction causes the other of said flexible members to rotate said wheel retainer arm in an opposite direction.

17. A wheel lift towing device according to claim 16, wherein each said wheel retainer arm is substantially L-shaped and has an arm portion and a transverse wheel engaging portion and said means for rotating each said wheel retainer arm rotates each wheel retainer arm through a radial path from a storage position wherein said wheel engaging portion is wrapped around an end of said cross bar to a fully open position wherein a back of each said arm portion is adjacent said cross bar and said wheel engaging portion of one wheel retainer arm is adjacent said wheel engaging portion of the other wheel retainer arm, each said wheel retainer arm having an intermediate position in said radial path wherein said arm portion is transversely oriented to said cross bar whereby said wheel retainer arm cooperates with an end of said cross bar to form an outwardly directed substantially U-shaped frame for engaging a wheel.

18. A wheel lift towing device according to claim 16, wherein said motive means for each wheel retainer arm comprises a movable portion and a fixed portion and wherein one end of each of said flexible members is attached to a wheel retainer arm, the other end of one of said flexible members is attached to one end of said movable portion and the other end of the other of said flexible members is attached to the other end of said movable portion.

19. A wheel lift towing device according to claim 16, wherein each said motive means comprises hydraulic cylinder means having a barrel movable along a fixed rod.

20. A wheel lift towing device according to claim 19, wherein said barrel and said fixed road are at an angle of approximately 15° to a longitudinal axis of said cross bar.

21. A wheel lift towing device according to claim 16, wherein each of said flexible members comprises a chain.

22. A wheel lift towing device according to claim 16, wherein each said retainer arm is substantially L-shaped.

23. A wheel lift towing device according to claim 22, wherein each said wheel retainer arm has an arm portion with a radial base at one end rotatably mounted to said cross bar and a transverse wheel engaging portion at the other end.

24. A wheel lift towing device according to claim 23, wherein said radial base terminates the arm at said one end and said flexible member is at least partially wrapped around said radial base.

* * * * *